US009670657B2

United States Patent
Lee (10) Patent No.: US 9,670,657 B2
(45) Date of Patent: Jun. 6, 2017

(54) WATER-SAVING TOILET (71) Applicant: Jae Mo Lee, Seoul (KR)

(72) Inventor: Jae Mo Lee, Seoul (KR)

( * ) Notice: Subject to any disclaimer, the term of this patent is extended or adjusted under 35 U.S.C. 154(b) by 330 days.

(21) Appl. No.: 14/368,802

(22) PCT Filed: Mar. 19, 2013

(86) PCT No.: PCT/KR2013/002210
§ 371 (c)(1),
(2) Date: Jun. 26, 2014

(87) PCT Pub. No.: WO2013/147447
PCT Pub. Date: Oct. 3, 2013

(65) Prior Publication Data
US 2015/0013056 A1    Jan. 15, 2015

(30) Foreign Application Priority Data

Mar. 29, 2012  (KR) .......................... 10-2012-0032053

(51) Int. Cl.
*E03D 9/05*   (2006.01)
*E03D 3/10*   (2006.01)
(Continued)

(52) U.S. Cl.
CPC ................. *E03D 3/10* (2013.01); *E03D 1/34* (2013.01); *E03D 5/012* (2013.01); *E03D 9/052* (2013.01); *E03D 11/10* (2013.01)

(58) Field of Classification Search
CPC ................................ E03D 5/012; E03D 5/052
(Continued)

(56) References Cited

U.S. PATENT DOCUMENTS 3,026,535 A * 3/1962 Langdon ................... E03D 1/22
4/358
4,178,644 A * 12/1979 Zarlengo ................. E03D 11/00
137/527.8
(Continued)

FOREIGN PATENT DOCUMENTS

KR       10-0509069      8/2005
KR    10-2010-0033949    3/2010
(Continued)

OTHER PUBLICATIONS

International Search Reort Dated Jun. 26, 2013 From the Korean Intellectual Property Office Re. Application No. PCT/KR2013/002210.

*Primary Examiner* — Allana Lewin Bidder
*Assistant Examiner* — Nicholas Ros (57) ABSTRACT

Disclosed is a water-saving sit-down toilet wherein the pressure of flushing water discharged from a cistern into the toilet is raised and a straight discharge pipe is used such that the toilet is flushed clean using a small amount of water, and, at the same time, excreta is smoothly discharged as the direct discharge tube is opened and closed by means of the water pressure and a permanent magnet and an electromagnet, and an appropriate amount of residual water is supplied to the toilet bowl such that odors are blocked from rising from a foul-water port into the toilet, and an odor removing unit sucks in odors emanating from the excreta and discharges same through the foul-water port such that the user can use the sit-down toilet without feeling any embarrassment.

4 Claims, 9 Drawing Sheets (51) Int. Cl.
*E03D 5/012* (2006.01)
*E03D 1/34* (2006.01)
*E03D 9/052* (2006.01)
*E03D 11/10* (2006.01)

(58) Field of Classification Search
USPC ... 4/348, 350, 351, 358, 360, 402, 406, 415, 4/434, 438
See application file for complete search history.

(56) References Cited

U.S. PATENT DOCUMENTS

| | | | |
|---|---|---|---|
| 6,499,150 B1 * | 12/2002 | Thompson | E03D 9/052 4/213 |
| 6,928,666 B1 * | 8/2005 | Schaffer | E03D 9/052 4/213 |
| 8,307,470 B2 * | 11/2012 | Abadi | E03D 3/00 4/406 |

FOREIGN PATENT DOCUMENTS

| | | | | |
|---|---|---|---|---|
| KR | 20100033949 | * | 3/2010 | E03D 5/012 |
| KR | 20-2010-0011360 | | 11/2010 | |
| KR | 10-2011-0051449 | | 5/2011 | |
| KR | 10-1046319 | | 7/2011 | |
| WO | WO 2013/147447 | | 10/2013 | |

* cited by examiner

WATER-SAVING TOILET

CROSS-REFERENCE TO RELATED APPLICATIONS

This application is a National phase of PCT Patent Application No. PCT/KR2013/002210 having International filing date of Mar. 19, 2013, which claims the benefit of priority of Korean Patent Application No. 10-2012-0032053 filed on Mar. 29, 2012. The contents of the above applications are all incorporated by reference as if fully set forth herein in their entirety.

TECHNICAL FIELD

The present invention relates to a water saving toilet that flushes the toilet using a dramatically small amount of flushing water, and more particularly, to a water saving toilet that increases a water pressure of flushing water to be discharged to the toilet by inserting a pressing tube into a cistern and that installs a straight discharge pipe to be automatically opened and closed by a water pressure of flushing water, a permanent magnet, and an electromagnet in a discharge port of the toilet and in which an odor removing unit that sucks and discharges an odor is installed and that thus smoothly discharges excreta, as the straight discharge pipe is automatically opened and closed by a water pressure of flushing water, a permanent magnet, and an electromagnet while cleanly flushing the toilet with a small quantity of flushing water by increasing a water pressure of flushing water discharged from the cistern to the toilet and that blocks an odor rising from a foul-water port to the toilet with a small quantity of flushing water housed within the toilet and in which a user can freshly use the toilet without a unpleasant feeling, as the odor removing unit sucks an odor generating when the user uses the toilet with a fan and discharges the odor to the foul-water port.

BACKGROUND ART

In general, 40% of countries on the earth including South Korea has been known to as a water shortage country, and recently, water resource exhaustion has been deepened due to a water shortage phenomenon and thus each country has actively advised to save water to citizens and therefore, a recognition of citizens on water saving has increased and thus various kinds of methods that can save water have been suggested in various forms.

When a person uses a toilet or a washbowl provided in a bathroom, much water is used and thus there is a problem that a great quantity of water is unnecessarily wasted, and particularly, in order to discharge sewage such as excreta and urine, the toilet uses much water of about 8-13 l at one time. Therefore, in order to reduce water consumption, in a normal home, a method of putting a brick or a pet bottle within a cistern of the toilet is used.

However, in such a method, because an amount of water decreases by a volume of a brick put within the cistern of the toilet, a water pressure of water discharged from the cistern into the toilet is lowered and thus there is a problem that excreta is not cleanly flushed in the toilet and thus the method is no fundamental countermeasure.

Therefore, in Korean Patent No. 10-0509069 (toilet having a variable siphon pipe), a flush toilet in which a variable siphon method and a natural discharge method are mixed by applying a variable siphon pipe to the toilet was suggested, but in the flush toilet, excreta is not smoothly discharged due to an erroneous operation, a blocking phenomenon of a discharge pipe occurs, and parts are easily worn out and thus there is a problem that the flush toilet is not actually produced as a product.

Further, because the toilet is mostly installed in a relatively narrow and closed space like a bathroom, when a user uses the toilet, a serious odor occurs, and the user feels an unpleasant feeling due to such an odor and a next user feels a serious unpleasant feeling.

Nowadays, in order to remove such an odor, a method of compulsorily discharging an odor by installing a ventilator at a wall or a ceiling or a method of inhaling an odor and liquefying and removing an ammonia gas, which is a cause material of an odor in water has been suggested, but the method is not economical and an effect thereof fell short of expectations.

Therefore, at a time point in which toilet culture improvement effort to improve an internal environment of a dirty and unpleasant bathroom is executed, necessity to effectively remove an odor or other unpleasant smell within the bathroom is further requested.

PRIOR ART DOCUMENT

Patent Document

Korean Patent No. 10-0509069

DETAILED DESCRIPTION OF INVENTION

Technical Problem

The present invention has been made to solve a problem of unnecessarily using a large amount of flushing water (use amount 8-13 l of one time) in a conventional toilet (a siphon pipe is necessary for preventing an odor from rising from a foul-water port, and in the siphon pipe, in order for excreta to pass over an S-shaped pipe, a large water pressure and much flushing water are necessary), a problem that excreta is not smoothly discharged due to an erroneous operation and that a blocking phenomenon of a discharge pipe occurs, and a problem that a user feels a unpleasant feeling due to a serious odor generating in excreta, and the present invention provides a water saving toilet that reduces consumed flushing water by increasing a water pressure of flushing water discharged to the toilet by inserting a pressing tube into a cistern and that mounts a straight discharge pipe instead of a conventional S-shaped siphon pipe in a discharge port of the toilet and that can smoothly discharge excreta with only a small amount of flushing water of about ½ to ⅓, compared with a toilet of a conventional siphon pipe form by installing an opening and closing port in an end portion of the straight discharge pipe and that can block an odor rising from a foul-water port to the toilet, as an end portion of the straight discharge pipe is completely sealed by packing and an iron piece mounted in the opening and closing port of the straight discharge pipe and a permanent magnet and an electromagnet installed at the opposite side of the opening and closing port and in which a user can freshly use the toilet without an unpleasant feeling, as the remaining water is housed at the toilet bottom and an odor removing unit sucks an odor occurring when the user uses the toilet and discharges the odor to the foul-water port.

Technical Solution

In accordance with an aspect of the present invention, a water saving toilet includes: a cistern in which a discharge valve that opens and closes a drain port is installed and in which a water supply valve and a water supply lever that open and close a water supply pipe are installed and in which a button that operates the discharge valve is installed; a pressing tube inserted into the cistern to be connected to the water supply lever of the water supply valve with a rope while housing flushing water; a toilet body in which a plurality of discharge holes are formed in a rear end circumference of a drain and in which an exhaust port is formed in a lower portion of the rear end thereof while forming a channel and a drain that discharge flushing water through the drain port of the cistern; a straight discharge pipe coupled to an exhaust port of the toilet body and in which an opening and closing port to be automatically opened and closed by a water pressure of flushing water and a permanent magnet is installed to discharge flushing water and excreta from the toilet body; a discharge box installed in the rear end of the straight discharge pipe and in which an electromagnet is installed at a side surface of one side of the inside thereof and that discharges excreta to a foul-water port, as a lower portion thereof is coupled to the foul-water port; and an odor removing unit in which a suction pipe is connected to the toilet body and the discharge box and that sucks an odor generating in excreta and that discharges the odor to the discharge box to remove the odor.

Advantageous Effects

According to an exemplary embodiment of the present invention, by cleanly flushing a toilet with a small quantity of water by increasing a water pressure of flushing water discharged from a cistern to the toilet, consumed flushing water is reduced, by mounting a straight discharge pipe instead of a conventional S-shaped siphon pipe in a discharge port of the toilet, and by installing an opening and closing port in an end portion of the straight discharge pipe in a structure to be opened and closed by a water pressure of flushing water, a permanent magnet, and an electromagnet, excreta can be smoothly discharged with a small amount of flushing water of about ½ to ⅓, compared with a toilet of a conventional siphon pipe form, and as an end portion of the straight discharge pipe is completely sealed by packing and an iron piece mounted in the opening and closing port of the straight discharge pipe and the permanent magnet and the electromagnet installed in the opposite side of the opening and closing port, an odor rising from a foul-water port to the toilet can be blocked, and the remaining water is housed at the toilet bottom, and an odor removing unit sucks an odor occurring when a user uses the toilet and discharges the odor to the foul-water port and thus the user can freshly use the toilet without an unpleasant feeling.

Particularly, in an exemplary embodiment of the present invention, a pressing tube is installed in the cistern, and by applying a straight discharge pipe instead of an S-shaped siphon pipe, which is a main cause of water waste, the toilet can be cleanly flushed with a few quantity of flushing water (4 l or less) and thus flushing water can be saved and water saving effect can be greatly provided, and by removing an odor, which is a problem of a bathroom, a fresh and comfortable bathroom can be provided.

BEST MODES FOR CARRYING OUT THE INVENTION

In an exemplary embodiment of the present invention, by increasing a water pressure of flushing water discharged from a cistern to a toilet, a toilet is cleanly flushed with a small amount of flushing water, excreta is smoothly discharged from the toilet, while an odor rising from a foul-water port to the toilet is blocked, and when a user uses the toilet, in order for a user to prevent from feeling a unpleasant feeling due to an odor generating in excreta, by inhaling an odor and discharging the odor to the foul-water port, fresh and comfortable bathroom space can be provided.

Hereinafter, a main configuration of a water saving toilet according to an exemplary embodiment of the present invention will be described with reference to the accompanying drawings. The water saving toilet includes a cistern 10 in which a discharge valve 14 that opens and closes a drain port 12 is installed and in which a water supply valve 15*a* and a water supply lever 15*b* that open and close a water pipe 15 are installed and in which a button that operates the discharge valve 14 is installed; a pressing tube 20 inserted into the cistern 10 to be connected to the water supply lever 15*b* of the water supply valve 15*a* with a rope 22 while housing flushing water; a toilet body 30 in which a plurality of discharge holes 32*a* are formed in a circumference of the lower end of a drain 31*b* and in which an exhaust port 40*a* is formed in a lower portion of the rear end thereof while forming a channel 31*a* and the drain 31*b* that discharge flushing water through the drain port 12 of the cistern 10; a straight discharge pipe 40 coupled to the exhaust port 40*a* of the toilet body 30 and in which an opening and closing port 41 to be automatically opened and closed by a water pressure of flushing water and a permanent magnet 43 is installed to discharge flushing water and excreta from the toilet body 30; a discharge box 50 installed at the rear end of the straight discharge pipe 40 and that discharges excreta to a foul-water port, as a lower portion thereof is coupled to the foul-water port while an electromagnet 51 is installed at a side surface of one side of the inside thereof; and an odor removing unit 60 in which a suction pipe 60*a* is connected to the toilet body 30 and the discharge box 50 and that sucks an odor generating in excreta and that discharges the odor to the discharge box 50 to remove the odor.

In the present exemplary embodiment, the straight discharge pipe 40 to be automatically opened and closed by a water pressure of flushing water, a permanent magnet, and an electromagnet is installed at the rear end of the toilet body 30 while increasing a water pressure of flushing water discharged to the toilet body 30 by inserting the pressing tube 20 into the cistern 10, and the odor removing unit 60 that sucks and removes an odor generating in excreta is formed.

Figure 1:
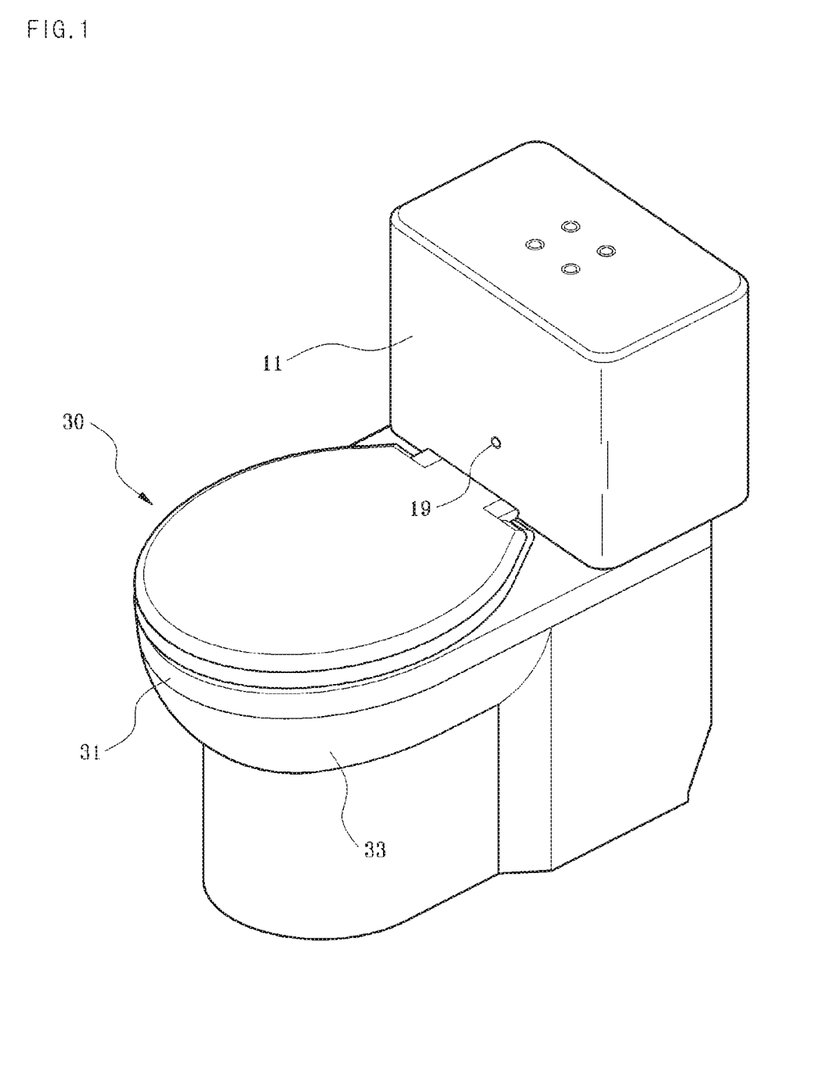
FIG. 1 is a perspective view illustrating a water saving toilet according to an exemplary embodiment of the present invention.
Figure 2:
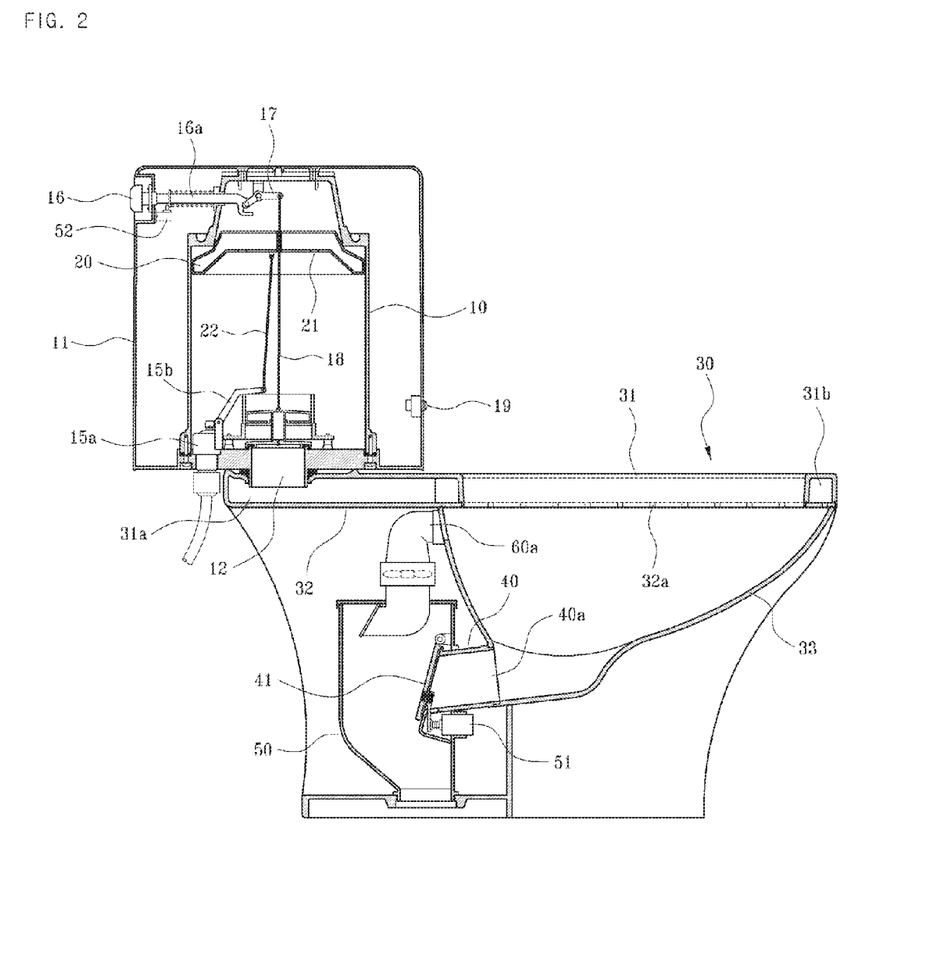
FIG. 2 is a cross-sectional view illustrating an installation state of a water saving toilet according to an exemplary embodiment of the present invention.
Figure 3:
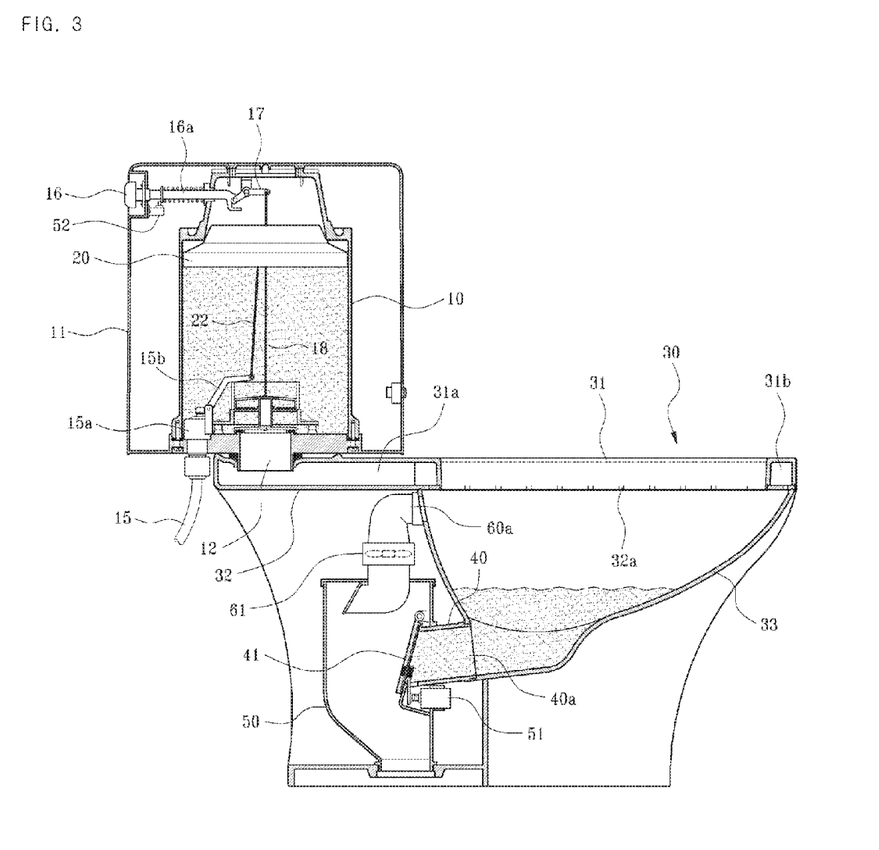
FIG. 3 is a cross-sectional view illustrating a use standby state of a water saving toilet according to an exemplary embodiment of the present invention.
Figure 4:
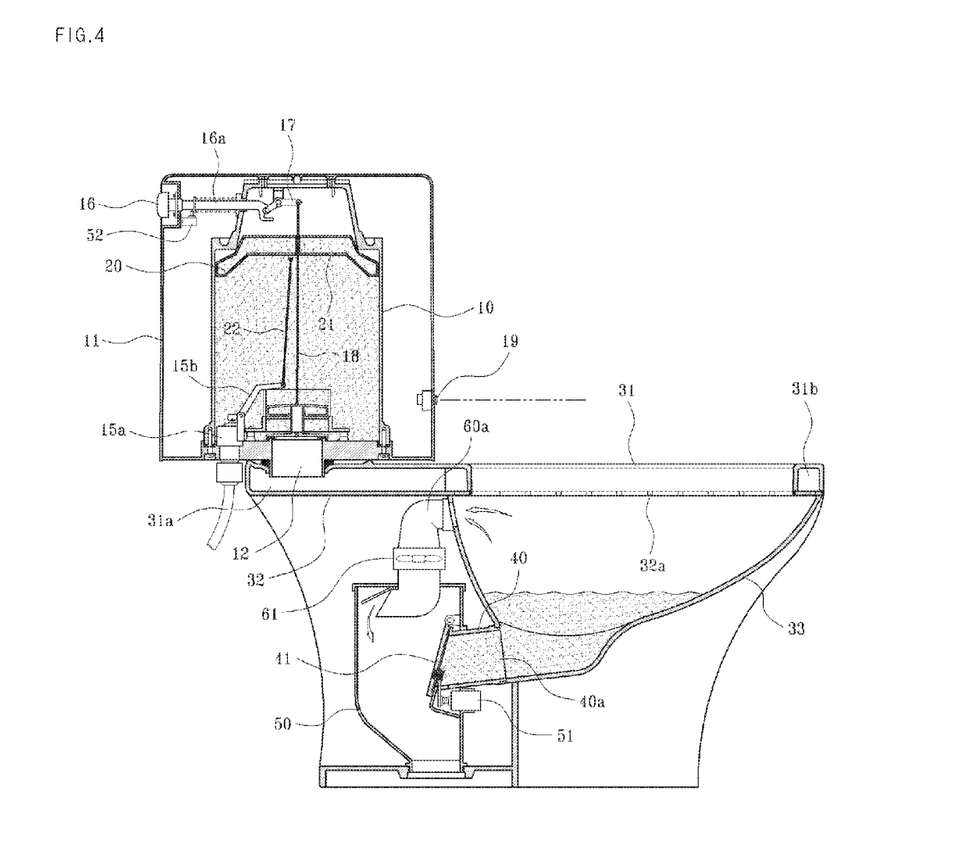
FIG. 4 is a cross-sectional view illustrating an operating state of an odor removing unit of a water saving toilet according to an exemplary embodiment of the present invention.
Figure 5:
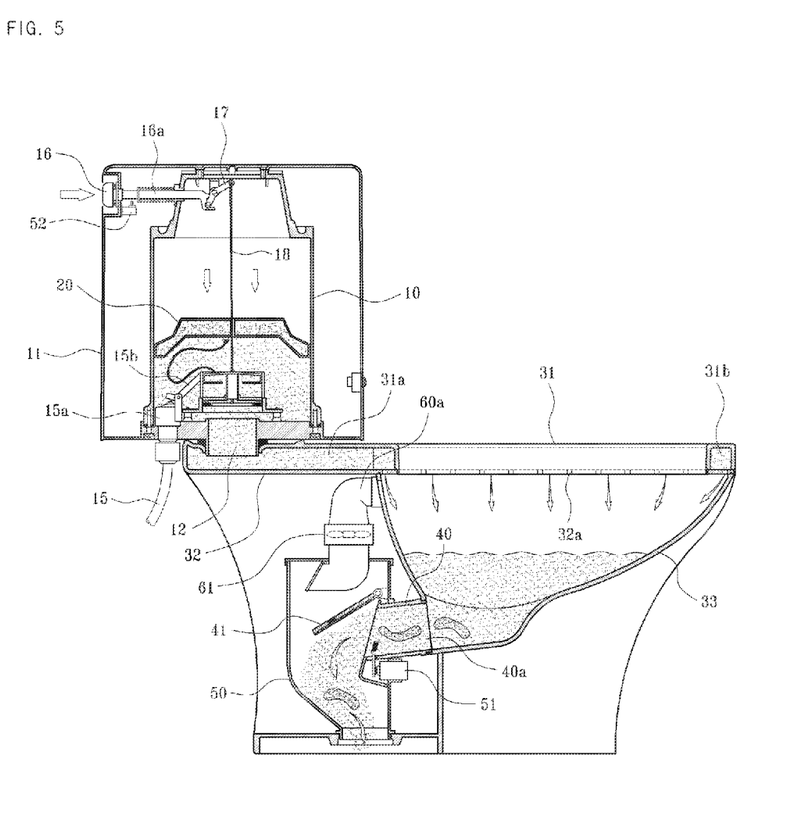
FIG. 5 is a cross-sectional view illustrating an operating state of a water saving toilet according to an exemplary embodiment of the present invention.
Figure 6:
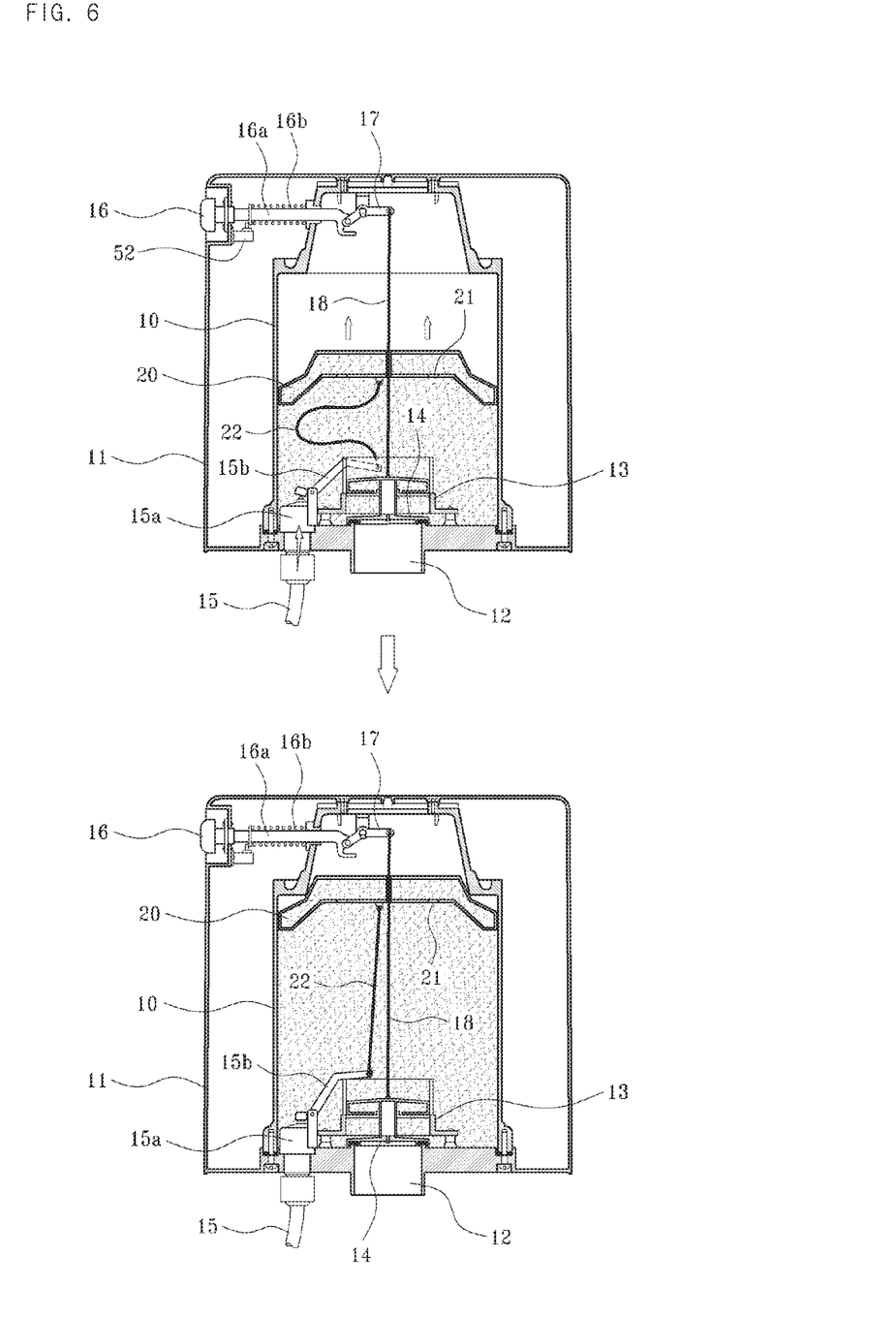
FIG. 6 is a partial cross-sectional view illustrating a water supply state of a cistern of a water saving toilet according to an exemplary embodiment of the present invention.

In a main configuration of the present exemplary embodiment, as shown in FIGS. 1 to 6, the cistern 10 is disposed at an upper portion of the rear side of the toilet body 30 to be described later, the cistern 10 is enclosed with a cover 11 at the outside thereof, the drain port 12, a valve holder 13, and the discharge valve 14 that discharge flushing water (tap water) to the toilet body 30 are formed in a lower portion thereof and the water pipe 15, the water supply valve 15*a*, and the water supply lever 15*b* that supply flushing water are installed at one side thereof.

At one side of an upper portion of the cover 11, the button 16, a lever 16*a*, and a spring 16*b* that open and close the discharge valve 14 are installed, and a link 17 that vertically rotates by the lever 16*a* is installed in an upper portion of the inside of the cistern 10, and a rope 18 is connected to an end portion of one side of the link 17 and an upper portion of the discharge valve 14.

At the cover 11, a detection sensor 19 is attached to the front side, which is location direction of a user, a proximity sensor, a temperature sensor, and a motion sensor may be applied to the detection sensor 19, and it is necessary that the detection sensor 19 detects a user.

Therefore, in the cistern 10, flushing water is supplied to internal space through the water pipe 15 and the water supply valve 15*a*, and after the user uses the toilet, when the user presses the button 16, the link 17 pulls the rope 18 upward by rotating, and thus the discharge valve 14 receives guidance of the valve holder 13 to operate to an upper portion and thus discharges flushing water to the toilet body 30 by opening the drain port 12.

Further, in a main configuration of the present exemplary embodiment, the pressing tube 20 performs a function of raising a water pressure of flushing water discharged from the cistern 10 to the toilet body 30, and as shown in FIGS. 2 to 6, the pressing tube 20 has internal space to float on a surface of flushing water housed within the cistern 10, a plurality (2 to 5) of inlet and outlet holes 21 are formed in a lower portion thereof to inject flushing water into internal space, and the rope 18 connected to the discharge valve 14 and the link 17 penetrates a central portion.

The pressing tube 20 may be produced in a shape of a cylinder or a rectangular parallelepiped according to a shape of internal space of the cistern 10, and it is necessary to vertically move the pressing tube 20 while close contacting with an inner side surface of the cistern 10, and in a state in which flushing water is housed at internal space by injection molding with plastic having a light weight, the pressing tube 20 floats on a surface of flushing water housed within the cistern 10, and a rope 22 is connected to a central portion of a lower portion and the water supply lever 15*b* of the water supply valve 15*a*.

Therefore, when flushing water is supplied into the cistern 10 through the water pipe 15 and the water supply valve 15*a*, flushing water is housed into internal space through a plurality of inlet and outlets hole 21 in a state in which the pressing tube 20 is floated on a surface of flushing water due to a light weight, and in this state, after a user uses the toilet, when flushing water is discharged from the cistern 10 to the toilet body 30 by pressing the button 16, a self-load of the pressing tube 20 and a load of flushing water housed at internal space are applied to flushing water housed in the cistern 10 and thus a water pressure of flushing water discharged to the toilet body 30 increases.

That is, when flushing water is discharged from the cistern 10 to the toilet body 30, a self-load of the pressing tube 20 and a load of flushing water housed at internal space of the pressing tube 20 operate at a surface of flushing water housed in the cistern 10 and thus a water pressure of flushing water discharged to the toilet body 30 increases.

Further, when flushing water is supplied into the cistern 10 through the water pipe 15 and the water supply valve 15*a*, the pressing tube 20 pulls the rope 22 while moving upward in a state floated on a surface of flushing water, and when an appropriate amount of flushing water is housed in the cistern 10, the water supply lever 15*b* of the water supply valve 15*a* rotates by pulling by the rope 22 and thus the water supply valve 15*a* is closed to prevent flushing water from supplying.

Further, in a main configuration of the present exemplary embodiment, as shown in FIGS. 1 to 5, the toilet body 30 is formed with an upper assembly 31, an intermediate assembly 32, and a lower assembly 33, and the drain port 12 of the cistern 10 is inserted into an upper portion of the rear side of the upper assembly 31 and is coupled thereto, and as the upper assembly 31 and the intermediate assembly 32 are coupled, while the channel 31*a* and the drain 31*b* that discharge flushing water are formed, a plurality of discharge holes 32*a* are formed in the intermediate assembly 32 to locate at a periphery of the lower end of the drain 31*b*.

The toilet body 30 may be produced by injection molding each of the upper assembly 31, the intermediate assembly 32, and the lower assembly 33 with plastic, and in this case, the toilet body 30 can be simply produced, have a light weight, have excellent workability, and be easily carried.

Therefore, when flushing water is discharged through the drain port 12 of the cistern 10, flushing water is discharged to a plurality of discharge holes 32*a* through the channel 31*a* and the drain 31*b* formed between the upper assembly 31 and the intermediate assembly 32 and thus flushing water can cleanly flush the toilet body 30 and excreta.

Figure 7:
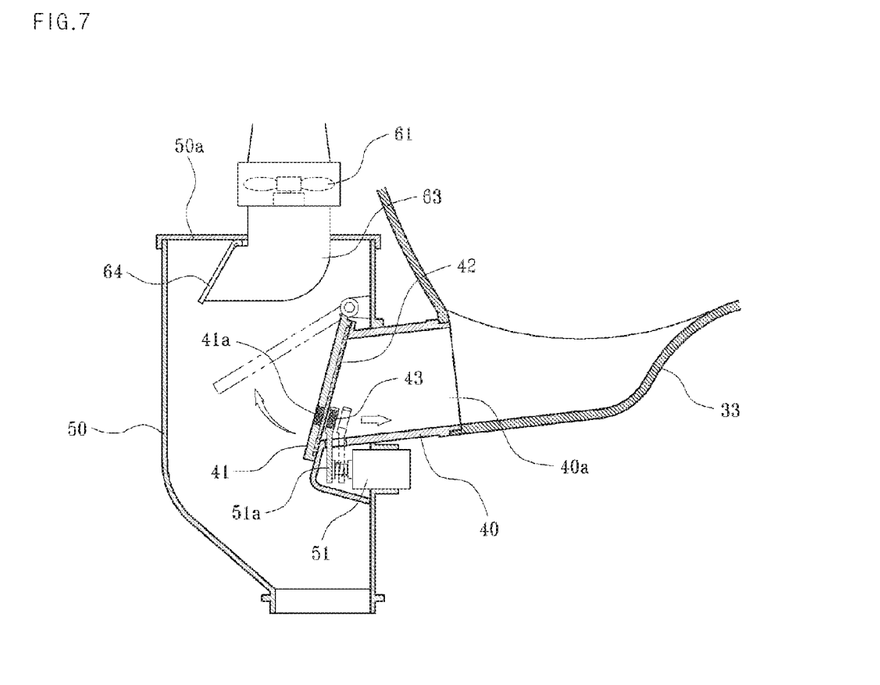
FIG. 7 is a partial cross-sectional view illustrating an opening and closing state of a straight discharge pipe of a water saving toilet according to an exemplary embodiment of the present invention.

Further, in a main configuration of the present exemplary embodiment, while the straight discharge pipe 40 smoothly discharges excreta and flushing water from the toilet body 30, the straight discharge pipe 40 performs a function of blocking an odor rising from a foul-water port, and as shown in FIGS. 2 to 5 and FIG. 7, a discharge port 40*a* of the straight discharge pipe 40 instead of a conventional S-shaped siphon pipe is formed in a lower portion of the rear end of the lower assembly 33 in the toilet body 30, the straight discharge pipe 40 is inserted into the discharge port 40*a* and is coupled thereto, and it is preferable that the straight discharge pipe 40 is formed in a cylindrical shape, and by installing an end portion thereof to be inclined downward, excreta and flushing water may be easily discharged.

In an end portion of the straight discharge pipe 40, the opening and closing port 41 to be automatically opened and closed by a water pressure of flushing water and the permanent magnet 43 is installed, and the opening and closing port 41 is installed to rotate by a hinge at the upper end of an end portion of the straight discharge pipe 40, packing 42 is attached to the front side that close contacts with the end portion of the straight discharge pipe 40, and in a lower portion of the rear side thereof, an iron piece 41a is attached and may be replaced with a permanent magnet.

In the straight discharge pipe 40, the permanent magnet 43 is installed at a location opposite to the opening and closing port 41 installed in an end portion thereof, the permanent magnet 43 performs a closing function by close contacting the opening and closing port 41 in an end portion of the straight discharge pipe 40 by pulling the iron piece 41a installed in the opening and closing port 41 by a magnetic force, and the permanent magnet 43 is mounted in a rotation shaft 51a of the electromagnet 51 to be installed at a location opposite to the iron piece 41a of the opening and closing port 41.

The electromagnet 51 operates by a switch 52 turned on/off by operation of the button 16 installed in the cover 11 of the cistern 10, and when a user presses the button 16, while the switch 52 is turned on, a magnetic force occurs by supplying power from the controller, and thus by separating the permanent magnet 43 from the iron piece 41a by pulling the rotation shaft 51a and the permanent magnet 43, a magnetic force of the permanent magnet 43 applied to the iron piece 41a is released, and thus after the opening and closing port 41 of the straight discharge pipe 40 opens by a water pressure, when an appropriate time (3-5 seconds) has elapsed, after excreta and flushing water are discharged from the toilet, by blocking power from the controller, when a magnetic force of the electromagnet 51 is disappeared, the permanent magnet 43 is returned to an original location by elasticity of a spring 51b mounted in the rotation shaft 51a and thus as a magnetic force of the permanent magnet 43 is applied again to the iron piece 41a, the straight discharge pipe 40 closes the opening and closing port 41 to be sealed.

Therefore, in the straight discharge pipe 40, as the opening and closing port 41 is automatically opened and closed by a water pressure of flushing water, the permanent magnet 43, and the electromagnet 51, excreta and flushing water are smoothly discharged from the toilet body 30, and an odor rising from a foul-water port is effectively blocked.

Further, in a main configuration of the present exemplary embodiment, as shown in FIGS. 2 to 5 and FIG. 7, the discharge box 50 is installed to seal by enclosing an end portion of the straight discharge pipe 40, and a cover 50a is put in an upper portion thereof, and in the cover 50a, a fan 61 and a discharge pipe 63 of the odor removing unit 60 in which an upper portion and a lower portion are installed to communicate are installed, and at a side surface of one side of the inside thereof, the opening and closing port 41, the permanent magnet 43, and the electromagnet 51 of the straight discharge pipe 40 are installed, and a lower portion thereof is coupled to the foul-water port and thus excreta and flushing water discharged through the straight discharge pipe 40 are discharged to the foul-water port.

At a side surface of one side of the inside of the discharge box 50, the rotation shaft 51a and the electromagnet 51 in which the permanent magnet 43 is mounted are attached, the electromagnet 51 and the permanent magnet 43 are installed to correspond to the iron piece 41a at a location opposite to a rotation direction of the opening and closing port 41 installed in the straight discharge pipe 40, when the permanent magnet 43 is separated by a predetermined distance from the iron piece 41a by pulling the permanent magnet 43 mounted in the rotation shaft 51a by a magnetic force of the electromagnet 51, a magnetic force of the permanent magnet 43 applied to the iron piece 41a is lost and thus the opening and closing port 41 is opened in the straight discharge pipe 40 by a water pressure.

The electromagnet 51 is operated by the switch 52 turned on/off by operation of the button 16 installed in the cover 11 of the cistern 10, and when a user presses the button 16, while the switch 52 is turned on, power is supplied from the controller to the electromagnet 51 and thus a magnetic force generates.

When the user presses the button 16, while flushing water housed in the cistern 10 is discharged to the toilet body 30, when the opening and closing port 41 installed in an end portion of the straight discharge pipe is opened by a water pressure and when excreta and flushing water are discharged, after the electromagnet 51 maintains the opening and closing port 41 in an open state for an appropriate time (3-5 seconds) by separating the iron piece 41a and the permanent magnet 43 by pulling the permanent magnet 43 by a magnetic force, as power is blocked, when a magnetic force is lost, the permanent magnet 43 is returned to an original location by the spring 51b and thus the opening and closing port 41 closes and seals the straight discharge pipe 40 and thus after excreta and flushing water are discharged from the toilet body 30, an appropriate amount of remaining water is provided to the bottom of the inside of the toilet body 30.

Figure 8:
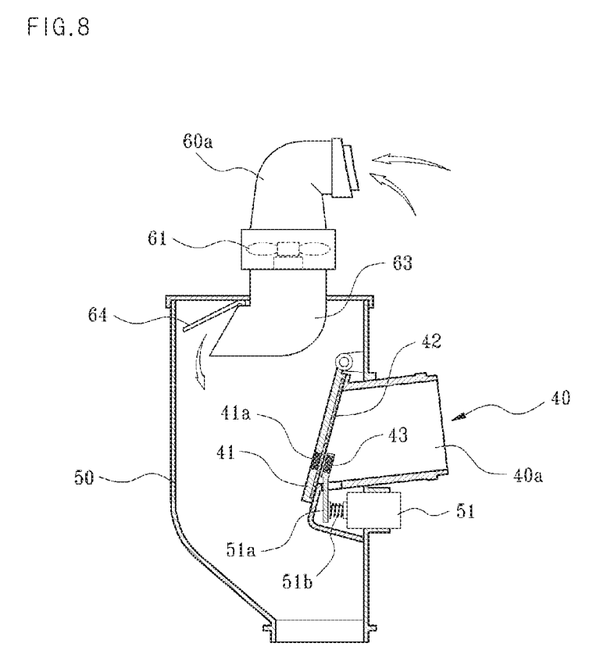
FIG. 8 is a cross-sectional view illustrating an installation state of an odor removing unit of a water saving toilet according to an exemplary embodiment of the present invention.
Figure 9:
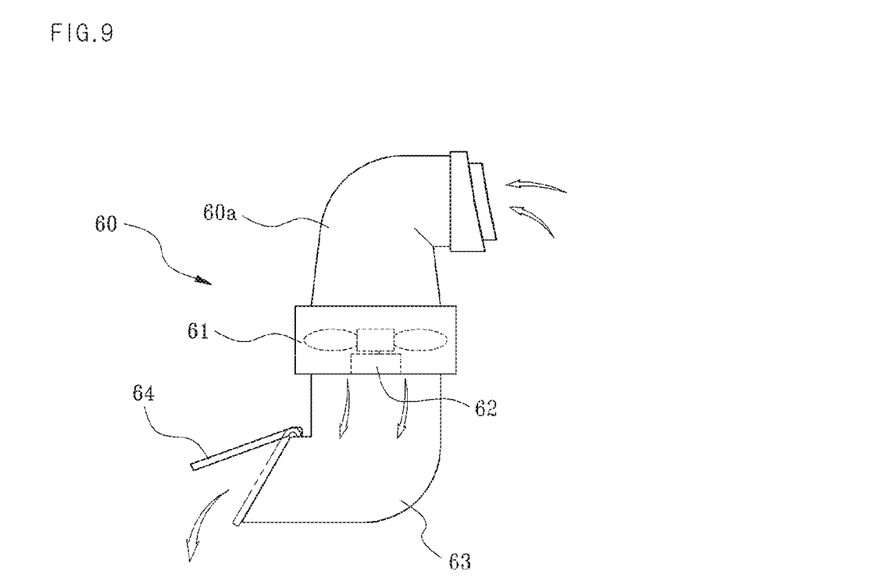
FIG. 9 is a cross-sectional view illustrating an operating state of an odor removing unit of a water saving toilet according to an exemplary embodiment of the present invention.

Further, in a main configuration of the present exemplary embodiment, as shown in FIGS. 2 to 5 and FIGS. 8 and 9, the odor removing unit 60 includes a suction pipe 60a connected to communicate with the toilet body 30 and the discharge box 50, a fan 61 installed in the suction pipe 60a and that sucks and discharges an odor by driving of a motor 62, and a discharge pipe 63 connected to the suction pipe 60a to be located at internal space of the discharge box 50 and in which a cover 64 to be opened and closed by a wind pressure is installed.

The suction pipe 60a is connected to the inside of the rear side of the lower assembly 33 and a side surface of one side of the discharge box 50 in the toilet body 30, and at one side of the suction pipe 60a, the fan 61 that operates by driving of the motor 62 is installed to suck an odor at the inside of the lower assembly 33 and to discharge an odor to internal space of the discharge box 50.

The discharge pipe 63 connected to the suction pipe 60a is located at internal space of the discharge box 50, and the cover 64 is installed to rotate by a hinge in an upper portion of the rear end of the discharge pipe 63 and thus when a wind pressure operates by operation of the fan 61, at the rear end of the discharge pipe 63, the cover 64 is opened, and as the fan 61 is stopped, when a wind pressure is lost, the cover 64 closes the rear end of the discharge pipe 63 by a self-load.

Therefore, in the odor removing unit 60, when the detection sensor 19 detects a user, the controller drives the motor 62 and thus the fan 61 rotates and the suction pipe 60a thus sucks an odor in generating in excreta and the odor is removed by discharging to the foul-water port through the discharge pipe 63 and the discharge box 50, and as the user is not detected, when the fan 61 is stopped, the cover 64 closes the discharge pipe 63 and thus discharge of an odor to the outside is blocked.

In an exemplary embodiment of the present invention, as a pressing tube is installed in a cistern, a water pressure of flushing water discharged from the cistern to a toilet body is increased, and by applying a straight discharge pipe structure instead of a conventional S-shaped siphon pipe using much flushing water, a use amount of flushing water is reduced and thus the toilet can be cleanly flushed with a very small amount of flushing water and thus waste of water can be reduced, and when the toilet body is divided into a upper assembly, an intermediate assembly, and a lower assembly and is made of a plastic material by injection molding, the toilet can be simply produced, have a light weight, have an excellent workability, and be easily carried.

Further, in an exemplary embodiment of the present invention, because a straight discharge pipe to be automatically opened and closed by a water pressure, a permanent magnet, and an electromagnet is installed at the rear end of a toilet body, excreta and flushing water are smoothly discharged from the toilet body, and by providing an appropriate amount of remaining flushing water within the toilet, while an odor rising from the foul-water port to the toilet is blocked, and by blocking sewage from being attached to an internal surface of the toilet, a flushing effect is enhanced.

Further, in an exemplary embodiment of the present invention, as an odor removing unit is installed, the odor removing unit sucks an odor generating in excreta and discharges the odor to the foul-water port and thus the user can use a toilet with a fresh feeling without feeling an unpleasant feeling.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

| Description of Symbols | |
|---|---|
| 10: cistern | 11: cover |
| 12: drain | 14: discharge valve |
| 15: water supply pipe | 15a: water supply valve |
| 15b: water supply lever | 16: button |
| 18: rope | 20: pressing tube |
| 21: inlet and outlet | 22: rope |
| 30: toilet body | 31: upper assembly |
| 32: intermediate assembly | 33: lower assembly |
| 40: straight discharge pipe | 40a: exhaust port |
| 41: opening and closing port | 43: permanent magnet |
| 50: discharge box | 51: electromagnet |
| 52: switch | 60: odor removing unit |
| 60a: suction pipe | 61: fan |
| 62: motor | 63: discharge pipe |
| 64: cover | |

The invention claimed is:

1. A water saving toilet, comprising:
a cistern (10) in which a discharge valve (14) that opens and closes a drain port (12) is installed and in which a water supply valve (15b) and a water supply lever (15b) that open and close a water supply pipe (15) are installed and in which a button (16) that operates a discharge valve (14) is installed;
a toilet body (30) in which a plurality of discharge holes (32)a) are formed in a circumference of the lower end of a drain (31b) and in which an exhaust port (40a) is formed in a lower portion of the rear end thereof while forming a channel (31a) and the drain (31b) that discharge flushing water through the drain port (12) of the cistern (10);
a straight discharge pipe (40) coupled to an exhaust port (40a) of the toilet body (30) and in which an opening and closing port (41) to be opened and closed by a water pressure of flushing water, a permanent magnet (43), and an electromagnet (51) is installed to discharge flushing water and excreta from the toilet body (30); and
a discharge box (50) installed at the rear end of the straight discharge pipe (40) and that discharges excreta to a foul-water port, as a lower portion thereof is coupled to the foul-water port while the electromagnet (51) is installed at a side surface of one side of the inside thereof;
wherein in the straight discharge pipe, the opening and closing port (41) is installed to rotate by a hinge in an upper end portion of an end portion thereof, the permanent magnet (43) is installed at a location symmetrical to the opening and closing port (41), and packing (42) is attached to the front side of the opening and closing port (41) and an iron piece (41a) is installed at the rear side thereof.

2. The water saving toilet of claim 1, further comprising an odor removing unit (60) formed with a suction pipe (60a) connected to communicate with the toilet body (30) and the discharge box (50), a fan (61) installed in the suction pipe (60a) and that sucks and discharges an odor by driving of a motor (62), and a discharge pipe (63) connected to the suction pipe (60a) to locate at internal space of the discharge box (50) and in which a cover (64) to be opened and closed by a wind pressure (63a) is installed.

3. The water saving toilet of claim 1, wherein the toilet body (30) is formed with an upper assembly (31), an intermediate assembly (32), and a lower assembly (33), and the drain port (12) of the cistern (10) is inserted into an upper portion of the rear side of the upper assembly (31) and is coupled thereto, and by coupling the upper assembly (31) and the intermediate assembly a channel (31a) and a drain (31b) that discharge flushing water are formed, and a plurality of drain holes (32a) are formed in the intermediate assembly (32) to locate at a lower end circumference of the drain (31b).

4. The water saving toilet of claim 3, further comprising an odor removing unit (60) formed with a suction pipe (60a) connected to communicate with the toilet body (30) and the discharge box (50), a fan (61) installed in the suction pipe (60a) and that sucks and discharges an odor by driving of a motor (62), and a discharge pipe (63) connected to the suction pipe (60a) to locate at internal space of the discharge box (50) and in which a cover (64) to be opened and closed by a wind pressure (63a), is installed.

* * * * *